United States Patent [19]
Montani

[11] Patent Number: 5,690,259
[45] Date of Patent: Nov. 25, 1997

[54] MODULAR BICYCLE RACK SYSTEM

[76] Inventor: John J. Montani, 2560 Williams, Holland, Mich. 49424

[21] Appl. No.: 640,535

[22] Filed: May 2, 1996

[51] Int. Cl.$^6$ ........................................ B60R 9/042
[52] U.S. Cl. ................ 224/310; 224/319; 224/924; 414/462
[58] Field of Search ............... 224/309, 310, 224/319, 321, 325, 326, 924; 414/462

[56] References Cited

U.S. PATENT DOCUMENTS

| | | |
|---|---|---|
| 2,551,351 | 5/1951 | Swenson . |
| 2,567,104 | 9/1951 | Di Fonzo . |
| 2,746,627 | 5/1956 | White . |
| 3,193,124 | 7/1965 | Essling . |
| 3,452,893 | 7/1969 | Heflin . |
| 3,460,694 | 8/1969 | Simms . |
| 3,495,729 | 2/1970 | Kruse ................................ 224/310 |
| 3,734,322 | 5/1973 | Vaillancourt . |
| 3,927,779 | 12/1975 | Johnson . |
| 3,931,919 | 1/1976 | Gerber et al. ................... 224/310 |
| 4,234,285 | 11/1980 | Martinez ........................... 414/462 |
| 4,339,223 | 7/1982 | Golze ............................... 414/462 |
| 4,728,244 | 3/1988 | Stokkendal ...................... 414/462 |
| 4,826,387 | 5/1989 | Audet ............................... 414/462 |
| 4,848,629 | 7/1989 | Mobius ............................. 224/315 |
| 5,360,150 | 11/1994 | Praz ................................ 224/310 |
| 5,377,886 | 1/1995 | Sickler ............................. 224/924 |
| 5,417,358 | 5/1995 | Haselgrove ...................... 224/310 |
| 5,447,408 | 9/1995 | Smith ............................... 414/462 |

FOREIGN PATENT DOCUMENTS

| | | | |
|---|---|---|---|
| 27531 | 4/1981 | European Pat. Off. | 224/310 |
| 67723 | 12/1982 | European Pat. Off. | 224/310 |
| 2596344 | 10/1987 | France | 224/310 |
| 3220417 | 8/1983 | Germany | 224/310 |
| 406107081 A | 4/1994 | Japan | 224/310 |

*Primary Examiner*—Henry J. Recla
*Assistant Examiner*—Gregory M. Vidovich
*Attorney, Agent, or Firm*—Waters & Morse, P.C.

[57] ABSTRACT

A modular bicycle rack system is useful with a vehicle that has a pair of rooftop transverse load bars that are spaced along the length of the vehicle. The rack system includes a base that is connected with the transverse load bars, and which may be one or more rail members, a slide connected in sliding engagement with the base to slide between a forward and a rearward position, a frame that is pivotally connected with the slide to pivot between an upper and a lower position, and which may be a channel member, and a clamp that connects between the base and the frame. A hanger releasably locks onto the frame to hang a bicycle on the frame when the frame is in the lower position. Alternatively, a cargo box may be coupled with the frame for convenient access to the cargo box.

21 Claims, 8 Drawing Sheets

MODULAR BICYCLE RACK SYSTEM

BACKGROUND OF THE INVENTION

The invention relates to modular rack systems for the rooftop of a vehicle. More particularly, the invention relates to bicycle rack systems that are used with vehicles that have a pair of rooftop transverse load bars.

Recent years have seen a surge of interest in the sport of bicycling. Not only has bicycling, as one may traditionally perceive it, enjoyed a new surge of interest, but the interest in bicycling has also branched off into a new direction, namely, off-road or mountain biking. Our urban streets and other common vehicle routes are already crowded with cars and tracks, however. It is, therefore, commonplace these days to see bicycle enthusiasts transporting their bicycles to off-road trails, to parks, and to paved, bicycle touting paths, and the like.

Various methods of bicycle transportation are used, including on top of their vehicles. One popular mode of transporting bicycles is the use of a stationary bicycle rack, supported on a vehicle rooftop by a pair of transverse load bars. This method of bicycle transportation does require rooftop access, however. Thus, rooftop bicycle racks commonly require use a ladder, or the like, or otherwise require the user to climb upon the top of the vehicle to access the rooftop rack to load or unload the bicycles. This is especially true when the transported bicycles are positioned toward the center of the vehicle, such as when multiple bicycles are carried, and when a van or sport/utility vehicle is the transporting vehicle.

Another potential difficulty with the presently known rooftop bicycle racks, arises when multiple bicycles are transported. If access to a bicycle near the center of the vehicle is desired, the bicycles toward the sides of the vehicle must first be removed.

These and other shortcomings and inconveniences of the presently known rooftop bicycle transportation systems are cleverly addressed by the present invention. With a bicycle rack system according to the invention, the rack comes to the user, rather than the user going on top of the vehicle to the rack. Any user can more safely and conveniently load a bicycle onto or retrieve a bicycle from a rooftop bicycle rack system according to the invention. Once the invention is installed, the loading and retrieving of a bicycle does not require the user to leave the ground. Rather, a frame of the invention slides rearward and tilts downward to maximize access by the user. The bicycle is securely fastened to the frame and the frame is then slid back into place, on top of the vehicle, and securely locked for transportation.

Further, regardless of whether one or multiple bicycles are being transported, no logistical planning is required to load or retrieve any one bicycle using the present invention. That is, the bicycles at the sides of the vehicle do not have to be removed in order to access the bicycles toward the center of the vehicle. Each bicycle may be loaded and retrieved independently.

Thus, a significant advance in the rooftop transportation of bicycles and the like is presented by the present invention.

SUMMARY OF THE INVENTION

A modular rack system according to the invention is useful with a vehicle that has a pair of rooftop transverse load bars with the load bars being spaced along the length of the vehicle. The rack system includes a base or rail, a slide connected in sliding engagement with the base, a frame pivotally connected with the slide, and a clamp connected between the base and the frame.

The base has a front portion that is connected with the forward one of the pair of transverse load bars, and has a back portion that is connected with the rearward transverse load bar. Thus, the base has a length that extends along a length of the vehicle and extends at least between the two transverse load bars.

The slide slides along the length of the base between a forward position at the front portion of the base, and a rearward position at the back portion of the base, when the frame is in its upper position. Further, when the slide is in the rearward position, the frame pivots between an upper position and a lower position. With the frame in the upper position and the slide in the forward position, the clamp connects the rail with the frame to lock the slide in the forward position and lock the frame in the upper position.

In one aspect of the invention, the rack system, and more particularly the base, may have at least one, or two or more, rails. Further, the frame may be a channel member with a tire receptacle that receives a tire of a bicycle and holds the tire from lateral movement, to align the tire with the base and the rack system.

In another aspect of the invention, a hanger is provided to receive and support a bicycle on the frame. The hanger may include a hanger lock to securely couple the hanger with the frame and to release the hanger to move it from one location on the frame to another location on the frame. The hanger may also have a hanger body and a hook that extends from the body, the hook being adapted to releasably receive a wheel of a bicycle to hang the bicycle on the hook, and thereby on the rack, when the frame is in the lower position.

In yet another aspect of the invention, the hanger may have a fork bolt instead of the hook. The fork extends through the hanger body and cooperates with the wheel fork of a bicycle to couple the wheel fork with the frame. Another option for a hanger that is used with the invention is a hanger that has a wheel bracket that extends from the hanger body, the wheel bracket being adapted to engage a bicycle wheel that is separate from a bicycle to couple the wheel with the rack and carry the wheel apart from a bicycle.

In a further aspect of the invention, the hanger may have a support member that extends generally perpendicular from the frame to releasably receive a tire of a bicycle and support the bicycle in alignment with the frame, when the frame is in the lower position.

The rack system may also include a brace that extends from the slide and connects with a bicycle to brace and hold the bicycle in a generally vertical plane. In an alternative aspect of the invention, a cargo box or the like may be coupled with the frame to pivot relative to the slide between the upper and lower positions and to slide with the slide between the forward and rearward positions, to conveniently access and carry the storage box.

These and other features, objects, and benefits of the invention will be recognized by those who practice the invention and by one having ordinary skill in the art, from the specification, the claims, and the drawing figures.

DESCRIPTION OF THE PREFERRED EMBODIMENTS

Figure 1:
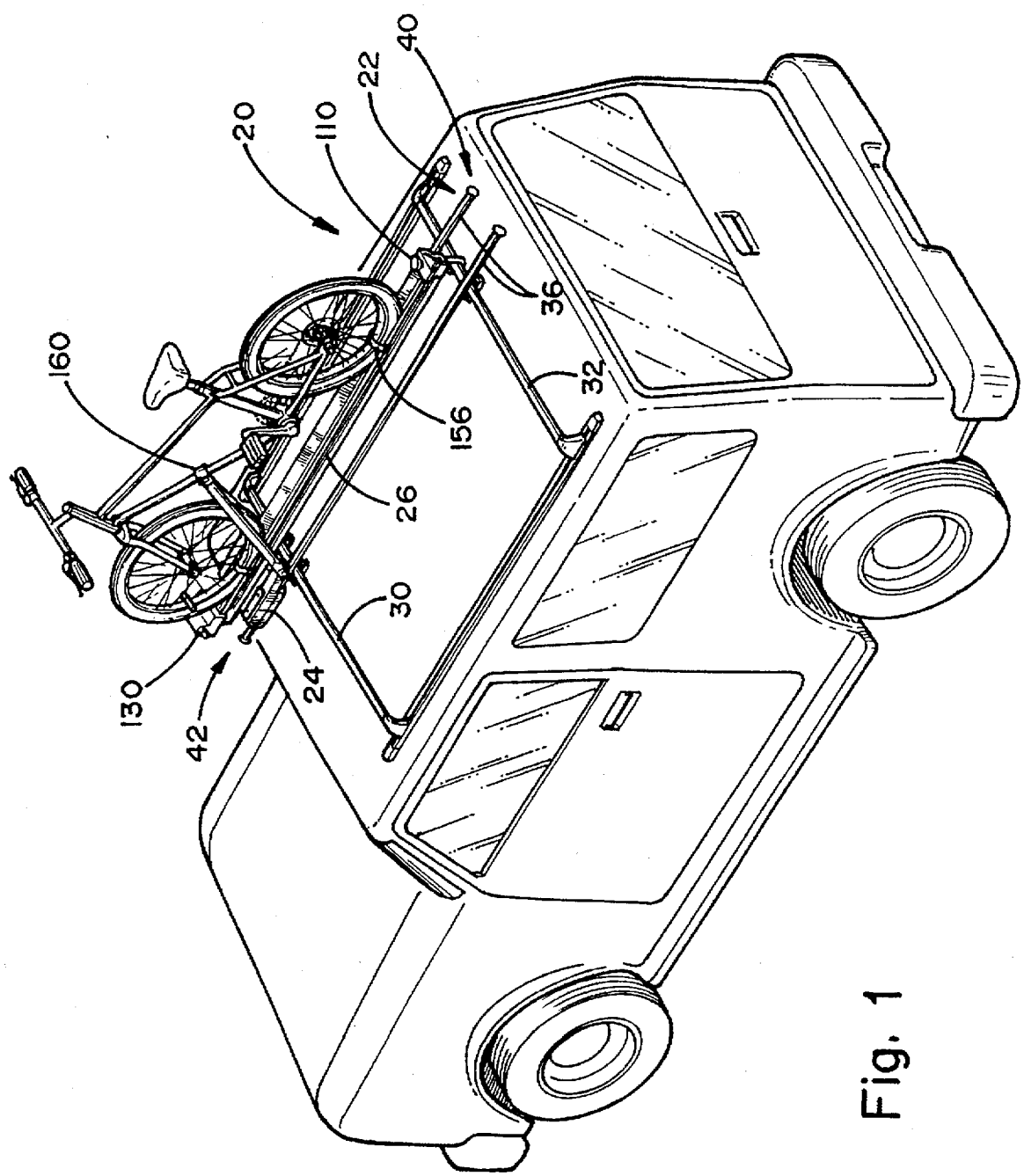
FIG. 1 is a perspective view of a modular bicycle rack system for a vehicle, according to the invention, shown in an upper position on a vehicle.
Figure 2:
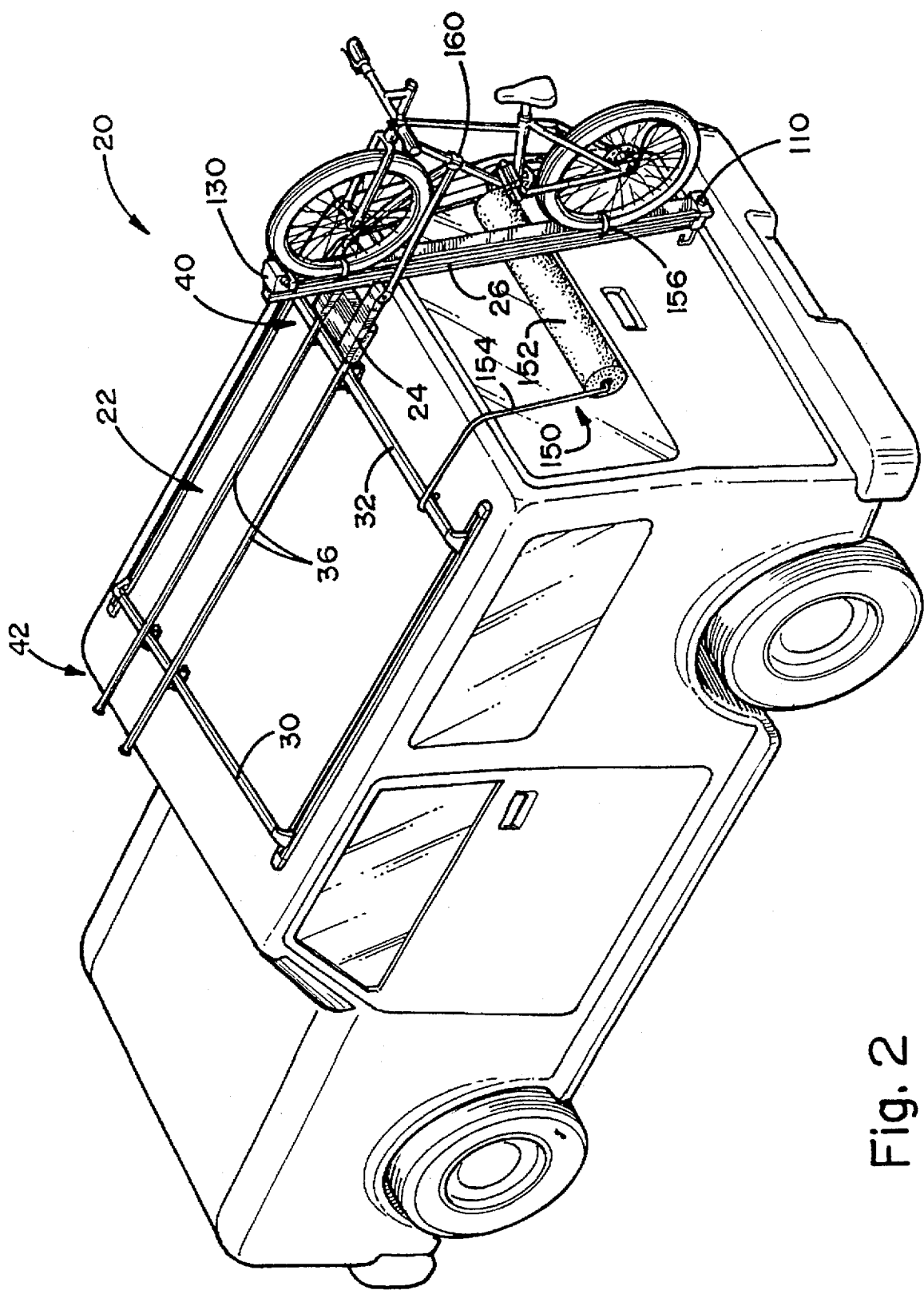
FIG. 2 is a the view of FIG. 1, showing the bicycle and frame in a lower position.
Figure 3:
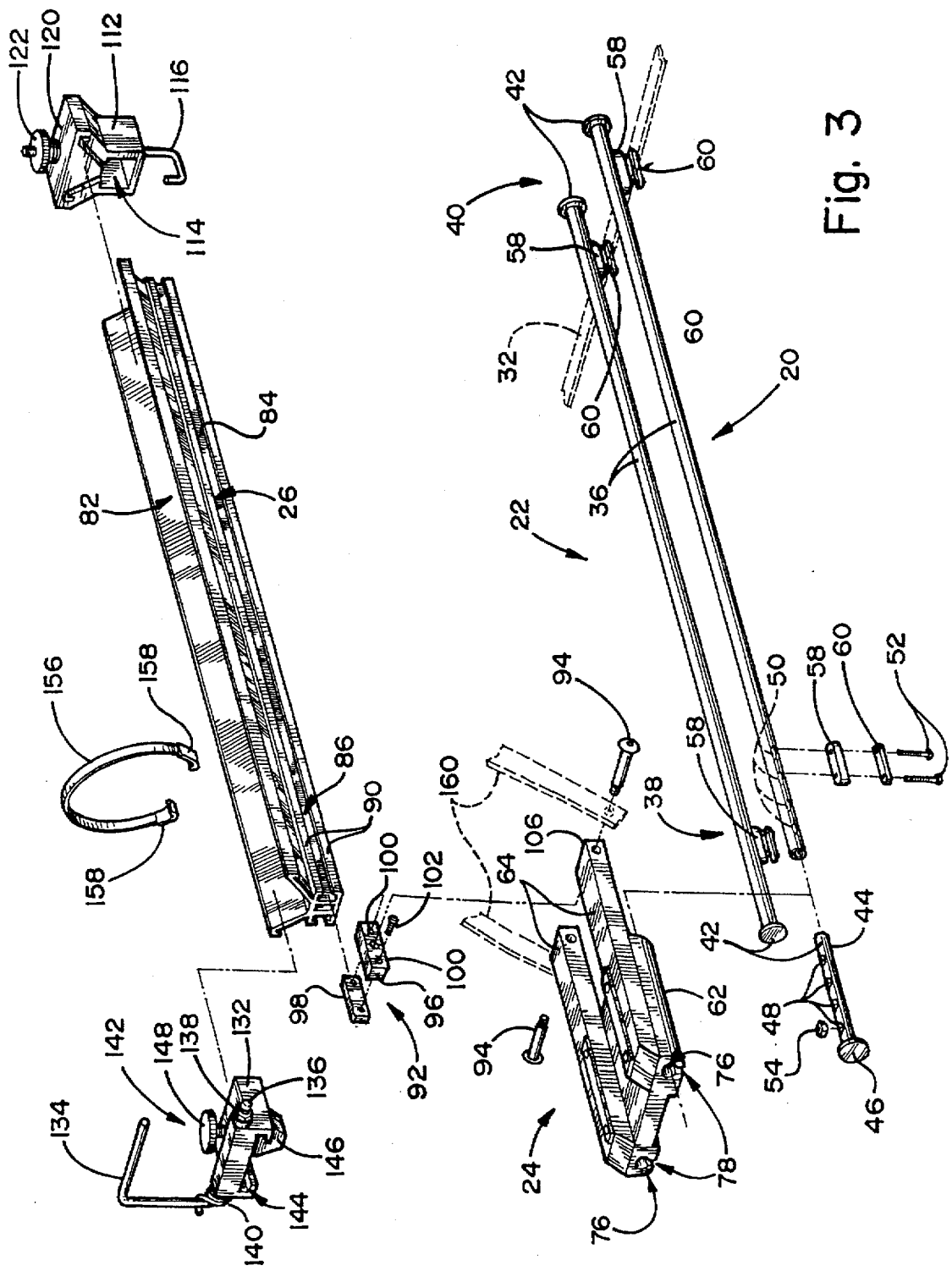
FIG. 3 is an exploded, front perspective view of the rack system of FIG. 1.

A modular rack system for the rooftop of a vehicle according to the invention, and more particularly a bicycle rack system, is generally shown in the drawing figures and identified by reference numeral 20. The rack 20 includes a base 22, a slide 24, and a frame 26 or channel (FIGS. 1-3). The rack system 20 is used with a vehicle that is already provided with a pair of rooftop transverse load bars 30, 32 with the load bars spaced along a length of the vehicle.

The base 22 has at least one, or two or more, rail 36 (FIGS. 1-3). The base 22 has a front portion 38 that is connected with the forward transverse load bar 30 and has a back portion 40 that is connected with the rearward transverse load bar 32. Thus, the base 22 has a length that extends along a length of the vehicle and extends at least between the two transverse load bars 30 and 32. More particularly, as is shown in the drawing figures, the base 22 may include two rails 36, defined by two lengths of about one inch (25 mm), heavy wall pipe or tube. The rails 36 may be constructed of any suitable structural material, including plastics and metals, for example, as will be understood by one having ordinary skill in the art. A length for the rails 36 of about five feet has been found to work well for transporting various single passenger bicycles. Of course, longer tubes or rails 36 and a third transverse load bar may be required for use of the invention with tandem bicycles and the like, as one having ordinary skill in the art will appreciate.

The rails 36 are secured to the transverse load bars 30 and 32 by the commonly known practice of screw clamping, or by other methods that may compliment a given securing system of specific transverse load bars. As shown in FIG. 3, a rail insert 42 with a shaft 44 and an enlarged head 46 is inserted into each of the two opposing ends of rails 36. The rail inserts 42 may be constructed of various suitable, structural materials, including plastics and metals, by various methods, suitable to the chosen material, as will be understood by one having ordinary skill in the art. A series of screw holes 48 are provided through the shaft 44 of the rail insert 42. The screw holes 48 align with a corresponding series of screw holes 50 that is provided near each of the two opposing ends of each of the rails 36. A series of each of screw holes 48 and holes 50 is provided to allow some variation of and adaptability to the relative spacing between transverse load bars 30 and 32.

Further, depending upon the material used to make the rail inserts 42, the screw holes 48 through the rail inserts 42 may be threaded to cooperate with and receive mounting screws 52, which are commonly available bolts about ¼ inch (6 mm) in diameter, or the like. Alternatively, one end of the screw holes 48 may be enlarged to receive a separate nut 54, seated in the enlarged end of the screw holes 48, to receive and thread onto the mounting screws 52. Of course, one having ordinary skill in the art will realize that a variety of mounting structures and methods may be used.

Figure 6:
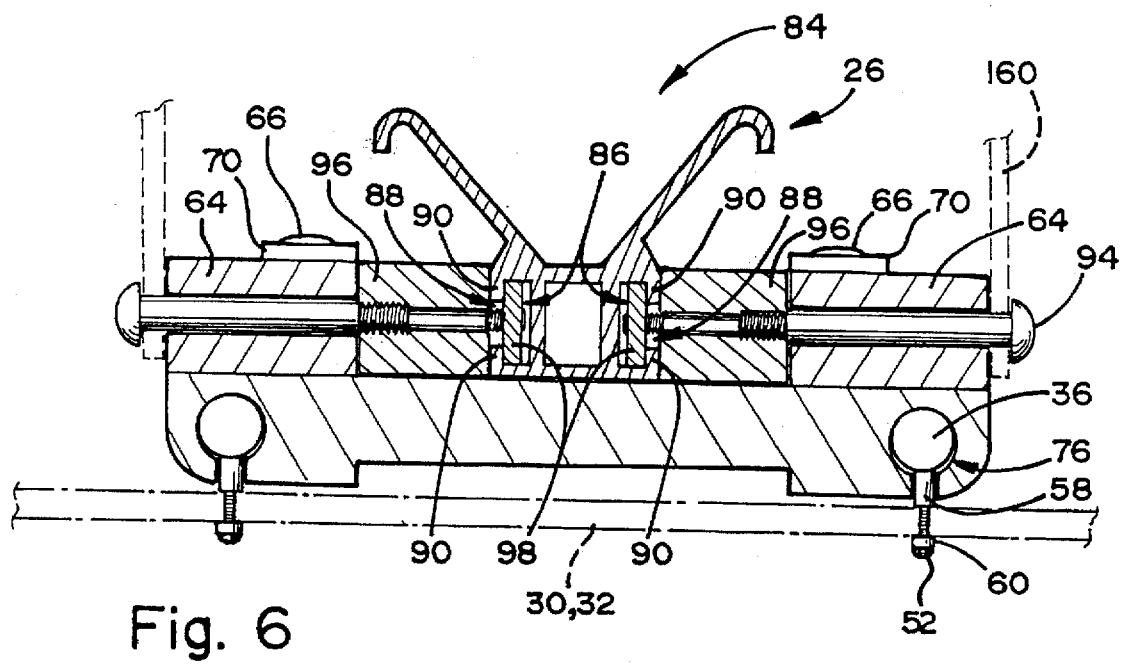
FIG. 6 is a forward looking, cross-sectional view, of the rack system, taken through the pivot pins.

In order to facilitate sliding of the slide 24 along the base 22 when tubular rails 36, or the like, are used, it is important that a spacer 58 be provided between the rail 36 and each transverse load bar 30 and 32, (FIGS. 3 and 6). The spacer 58 may be an about two inch (50 mm) long and about 5/16 inch (8 mm) thick metal or plastic block, and may further be adapted for a particular transverse load bar so that interchangeable spacers may be used for mounting the rails 36 to various, differing transverse load bars. Regardless of the specific transverse load bar to which the rail is being mounted, however, each spacer will provide at least an about ½ inch (13 mm) spacing of the tubular rails 36 from the transverse load bar 30 and 32, so the slide 24 will freely slide along the base 22 without abutting the transverse load bars or otherwise having the load bars interfere with the movement of the slide 24. Opposite the transverse load bars 30 and 32 from the spacer 58, an about 3/16 inch (5 mm) thick, about two inch (50 mm) long, and about 5/16 inch (8 mm) wide rectangular mounting plate 60 or the like is used to clamp the transverse load bars between the mounting plate 60 and the spacer 58 with the mounting screws 52. One having ordinary skill in the art will also appreciate that various styles of mounting screws and mounting methods may be used to mount the rails to the transverse load bars, including, but not limited to, locking and non-locking screws and methods, and screws and methods that may or may not require the use of tools.

Figure 4:
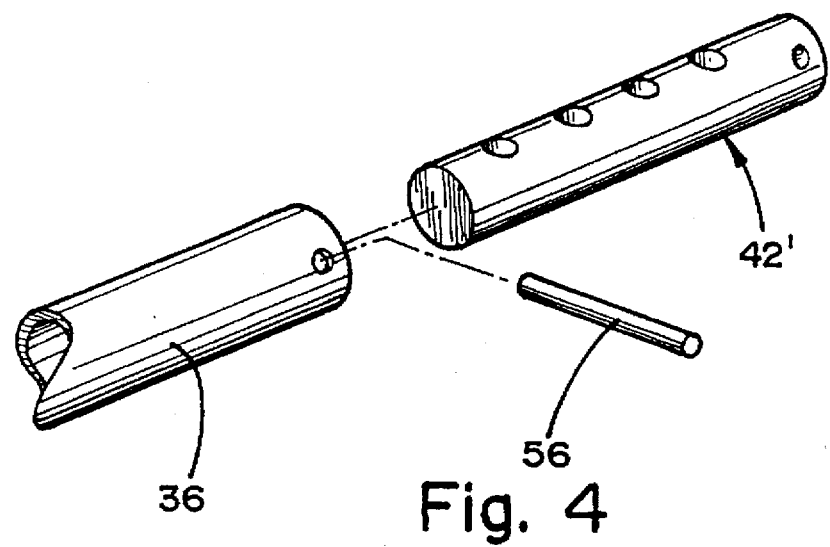
FIG. 4 is a fragmentary, exploded detail view of one end of a rail, showing an alternative rail insert.

As shown in FIG. 3 and discussed above, the rail inserts 42 are formed with a shaft 44 and an enlarged head 46 that extends well beyond the perimeter of the rails 36. Thus, when the slide 24 is mounted on the rails 36 and the rail inserts 42 are in place, the heads 46 of the rail inserts 42 form stops against which the slide 24 abuts at each end of the base 22. Depending upon the needs and preferences of those who make or use the invention, other means for providing a slide stop at each of the opposing two ends of the base 22 may be provided. These alternative means may, for example, include making the head 46 of the rail insert 42 flush with the outside of the rail 36 or even making the rail insert 42 cylindrical (FIG. 4), without any head, and providing an about 1½ inch (38 mm) cross-pin 56 at the end of the base 22, for the slide 24 to abut and stop against. Another option (not shown) may include providing a stop member that interconnects and spaces at a predetermined distance, the front ends, or back ends, of the rails 36. As will be better understood with the description of the use and mounting of the slide 24 to the base 22, below, the use of a removable cross-pin, a cleavice pin or the like, for example, at the back end of the rails 36 allows the slide 24 and frame 26 assembly to be removed from the base 22 without disrupting the mounting of the base 22 on the transverse load bar 30 and 32.

The slide 24 (FIGS. 3, 5, and 6) has a generally square body portion 62 with at least one pivot arm 64 that extends generally rearward from the slide body 62. A typical size of slide body portion 62 may be about 9½ inches (241 mm)

wide, about eight inches (203 mm) long, and about two inches (50 mm) thick, with the pivot arm 64 being about one inch (25 mm) thick, about three inches (76 mm) wide, and about twelve to about twenty inches (305–508 mm) long, depending upon the specific installation (vehicle). Thus, the pivot arm 64 extends rearward, beyond the slide body 62 to extend rearward beyond the end of the base 22. The slide 24 may also be made of various, suitable structural materials, including plastics and metals, for example. Depending upon the specific material chosen, one who makes or uses the invention may find that molding the slide 24 in one piece or fabricating the slide 24 from several pieces as shown, may be preferred. If slide 24 is assembled from separate components, the pivot arms 64 may, for example, be bolted to the slide body 62 with bolts 66 or the like, that extend through bolt holes 68 in a slide plate 70, pivot arms 64, and slide body 62 to extend through washers 72 and engage nut 74. Again, various techniques may be utilized to couple the pivot arms 64 and the slide body 62, including using a second slide plate 70 in place of the washers 72 or replacing the slide plate 70 with washers 72, for example, as one having ordinary skill in the art will understand.

Figure 5:
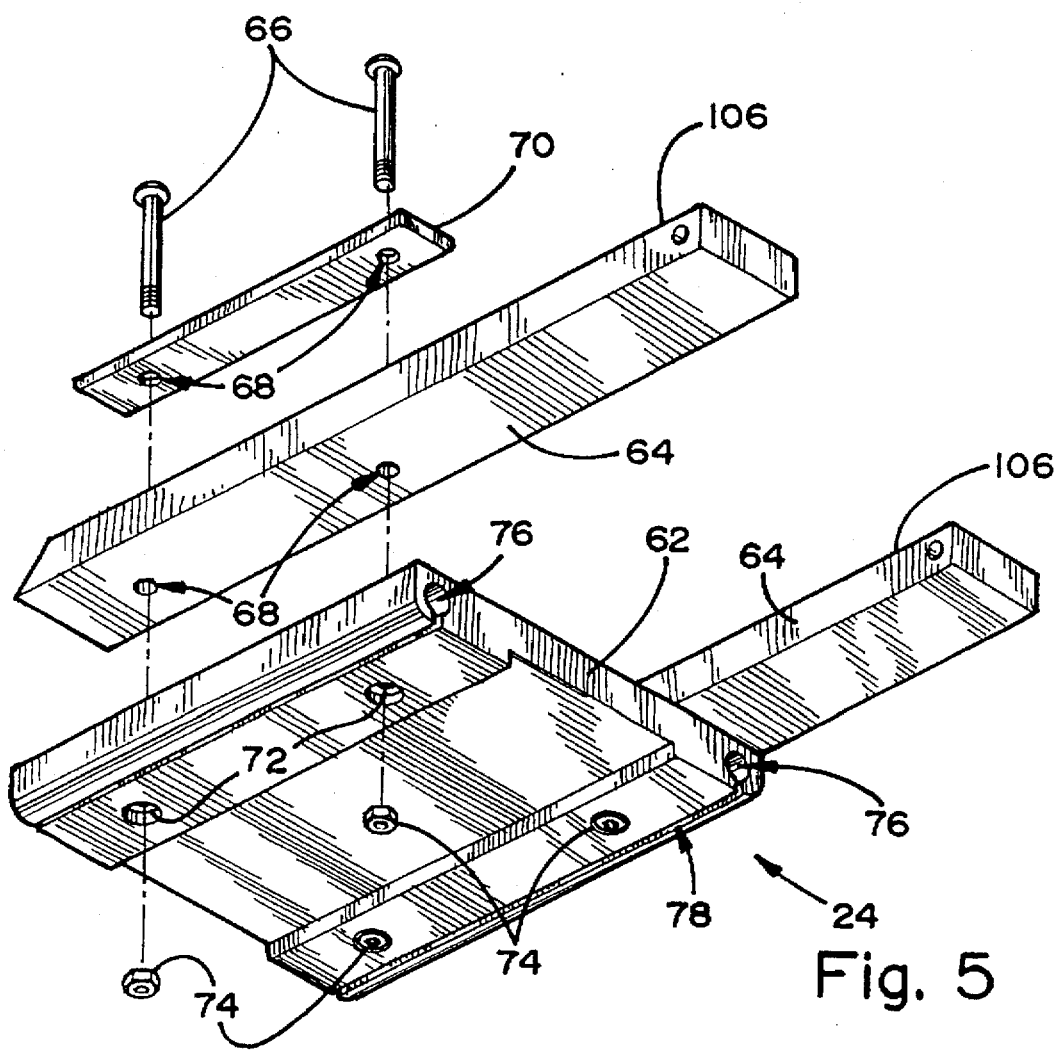
FIG. 5 is a partially exploded, perspective view of the slide of the rack system.

To engage the base 22, and more particularly the rails 36, in sliding engagement, slide 24 has a pair of rail receptacles 76 (FIGS. 3, 5 and 6). The receptacles 76 have cross-sectional shapes that correspond to the cross-sectional shapes of the rails 36, and are sized appropriately for sliding of the rails 36 in the receptacles 76. The receptacles 76 also have a slot 78 that is adapted to pass the rail spacer 58, when the slide 24 slides to the ends of the base 22. Further, it is preferred that the dimension across the slot 78 is significantly less than the dimension across the receptacle 76 to preclude the rail 36 from slipping through the slot 78, either in normal use or in the event the transport vehicle is involved in a collision.

The frame 26 that is shown in the drawing figures is an elongated channel that is specifically adapted for transporting a bicycle (FIGS. 3 and 6–9). The frame 26 may be constructed of various suitable structural materials, including plastics and metals, for example. Also, various methods of construction, including extrusion, for example, may be used to form the channel. The channel 26 is preferably formed with a top, V-channel 82 that flares about forty-five degrees outward from an about ⅜ inch (9 mm) wide base to receive and support the tires of a bicycle. The frame or channel 26 is also preferably provided with a pair of opposing side channels 84. Each of the side channels 84 has a seat portion 86 that is about ¾ inch (19 mm) tall and about 3/16 inch (4 mm) wide and that has an about ¼ inch (6 mm) wide throat portion 88 that is located between opposing, inwardly extending flanges 90 that are about 3/32 inch (2 mm) thick.

The frame 26 is pivotally mounted to the pivot arms 64 by the use of pivot blocks 92 and pivot pins 94 (FIGS. 3 and 6–8). Each pivot block 92 has an about two and ⅜ inch (9 mm) long, about one inch (25 mm) wide, and about ⅞ inch (22 mm) thick body portion 96 and a corresponding clamp plate 98 that is about 3/16 inch (4 mm) thick. The body portion 96 is provided with a pair of screw holes 100, into which a pair of commonly available, ¼ inch (6 mm) clamping screws 102 freely slide. The clamp plate 98 is drilled and tapped with corresponding threads for the screws 102 to engage and draw the clamp plate 98 toward the pivot block body 96. The clamp plate 98 is inserted and set into the side channel seat portion 86 of the frame or channel 26. The pivot block 92 is positioned appropriately along the length of the frame 26, about twelve to about twenty-four inches (305–610 mm) away from the front end of the frame, and the screws 102 are tightened down to clamp the flanges 90 between the pivot block body 96 and the clamp plate 98. The pivot block body 96 is also provided with a threaded aperture 104 that is generally centered on the pivot block 92, to receive the pivot pin 94.

The pivot pins 94 are inserted through pivot holes 106 that are provided near the back ends of the slide pivot arms 64, and are threaded into the threaded apertures 104. The pivot pin 94 is preferably a shoulder bolt or the like, having an about ½ inch (13 mm) shaft with an about ⅜ inch (9 mm) thread, so that the pivot pin 94 may be screwed tightly into the pivot block 92 with the bolt shoulder abutting the pivot block 92, without drawing the pivot block 92 tightly against the pivot arm 64 and binding or otherwise restricting rotation of the frame 26 and pivot block 92 relative to the pivot arm 64.

A frame clamp 110 (FIG. 9) is provided at the back end of the frame 26 to lock the frame relative to the base 22 when the frame 26 is in the upper position and the slide 24 is in the forward position. The clamp 110 has a clamp body 112 that couples with the back end of the frame 26. The clamp body 112 may be made of any suitable structural material, including plastics and metals, for example. The clamp body 112 has a cooperating recess 114 that corresponds to the cross-sectional shape of the frame 26, so the clamp body 112 slides over the end of the frame 26. With the clamp body so positioned, an about ⅜ inch (9 mm) diameter wire clamp hook 116 is inserted through a hook hole 118 that extends through the clamp body 112 and through the end of the frame 26. Thus, insertion of the clamp hook 116 through the hook hole 118 ties the clamp body 112 to the frame 26. A spring 120 and a nut 122, such as a hand nut, for example, are threaded over the end of the clamp hook 116 as shown.

Figure 7:
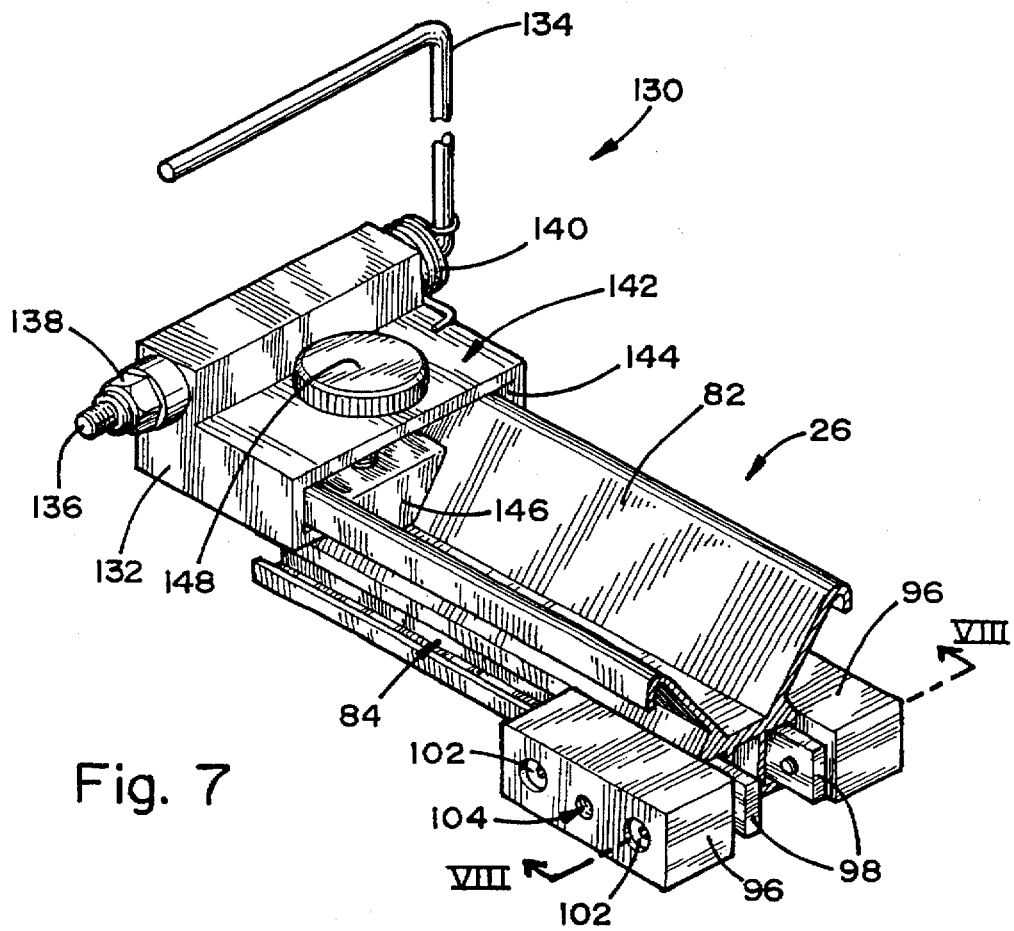
FIG. 7 is a fragmentary perspective view of a front end of the frame, showing the pivot block and the hook hanger assemblies.
Figure 8:
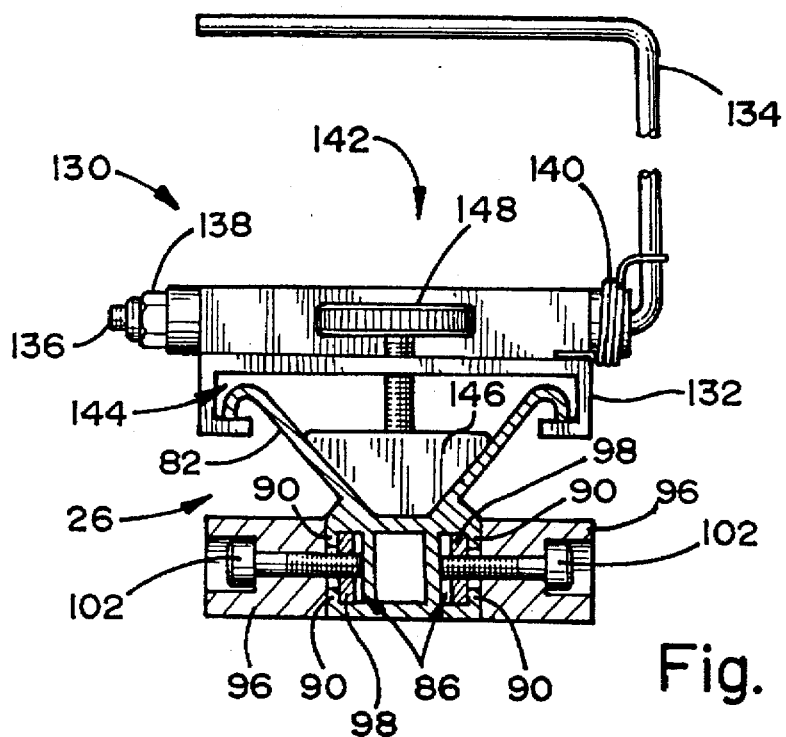
FIG. 8 is a cross-sectional view along line VIII—VIII of FIG. 7.
Figure 9:
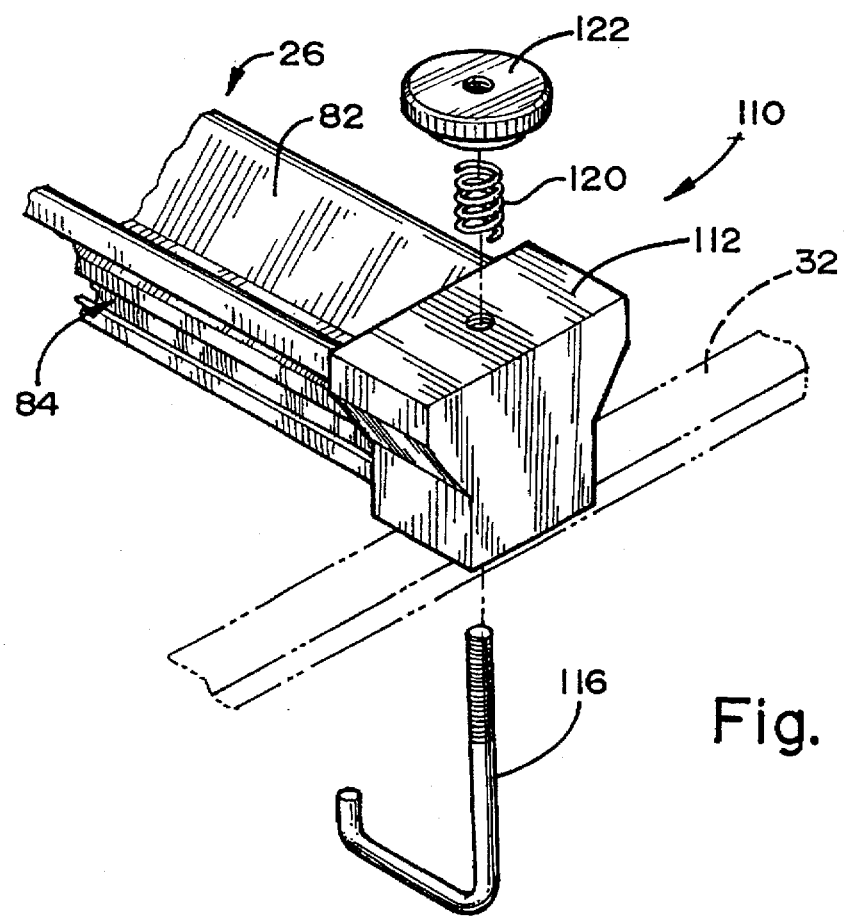
FIG. 9 is a fragmentary perspective view of the back end of the frame, showing the frame clamp.

At the front end of the frame 26, a hanger 130 (FIGS. 3, 7, and 8) is provided for hanging a bicycle when the slide 24 is in the rearward position and the frame 26 is in the lower position (FIG. 2). The hanger 130 has an about two inch (51 mm) long, about 3¼ inch wide (82 mm), and about 1½ inch (38 mm) thick hanger body 132 and a hanger hook 134 (FIGS. 3, 7, and 8). The hanger body 132 has a generally downward opening C-shaped channel 144 that is adapted to couple a sliding engagement with the V-channel 82 of the frame 26.

The hanger hook 134 extends through a hole that extends transversely through the hanger body 132. The hanger hook 134 is a generally U-shaped, about ⅜ inch (9 mm) diameter wire member with one leg 136 that is slightly longer than the other. It is the longer leg 136 that extends through the hanger body 132. The end of the longer leg 136 is threaded to cooperate with a lock nut 138 for locking the hanger hook 134 in the hanger body 132. Thus, the hanger hook 134 pivots relative to the hanger body 132. A positioning spring 140 is also provided to hold the hanger hook 134 generally perpendicular to the frame 26 as shown in FIGS. 3, 7, and 8. A hanger lock 142 is also provided on the hanger 130 to securely couple the hanger with the frame 26. The hanger lock 142 has a locked position and an open position. When the hanger lock 142 is in the open position, the hanger 130 may be moved from one location of the frame 26 to another location of the frame. The hanger lock 142 comprises a generally V-shaped block 146 and a hand screw 148. The V-block 146 corresponds to the V-channel 82 and is pressed into the V-channel by manipulation of the hand screw 148 to create a friction lock of the hanger 130 to the V-channel 82.

Depending upon the particular vehicle with which the rack 20 is used, the frame 26 will either extend down to rest against the vehicle's bumper, when the frame is in the lower position, or may come to rest against the body of the vehicle. In order to protect the vehicle in the situation where the frame 26 may come to rest against the body of the vehicle, in the lower position, a protective bumper 150 (FIG. 2) is provided. The bumper 150 includes a generally cylindrical foam cylinder 152 that is interposed between the frame 26 and the body of the vehicle (FIG. 2). The foam cylinder 152 may be an about one foot (300 mm) to about five feet (1500 mm) length of an about six inch (150 mm) diameter extruded foam cylinder. The foam cylinder 152 may be made of any suitable material, including the closed cell plastic foam that is commonly known to be used for boat bumpers and plumbing pipe insulation, for example. The foam cylinder 152 is held in position by a pair of hanging straps 154 of any suitable material, that extend from the opposite ends of the foam cylinder. The hanging straps 154 may simply be tied to the rear transverse load bar 32, or may be provided with a clip device for conveniently clipping onto the rear load bar 32.

In use, the rack 20, with the rails 36 seated in the slide receptacles 76, is placed upon the transverse load bars 30 and 32 (FIGS. 1 and 2). With the slide 24 in the forward position, the front portion 38 of the base 22 is secured to the front load bar 30 with the spacer 58, mounting plate 60, and mounting screws 52, as is discussed in greater detail above. To position and secure the back portion 40 of the base 22, the slide 24 is slid to the back portion of the base and the rails 36 are clamped to the rear load bar 32 with the spacers 58, mounting plate 60, and mounting screws 52.

With the rack system 20 secured to the transverse load bars 30 and 32, a bicycle may be loaded for transportation by disengaging the frame clamp 110 from the rear transverse load bar 32, pulling the frame 26 rearward to slide the slide 24 to the rearward position at the back portion 40 of the base 22, and pivoting the frame 26 to the lower position with the frame resting against the bumper 150, if needed (FIGS. 1 and 2). With the slide 24 in the rearward position and the frame 26 in the lower position, a bicycle is conveniently loaded onto the rack by engaging either of the front or rear wheels of the bicycle with the hanger hook 134 of hanger 130. With the bicycle wheel and hanger 130 so engaged, both wheels of the bicycle are seated in V-channel 82 and the bicycle may be released by the user to hang from the hanger 130. With the bicycle so positioned, the front and back wheels of the bicycle are strapped to the frame 26 with commonly known straps or ropes and the like. Also, a resilient, elastic strap 156 that is specifically adapted to engage or hook onto the side channels of the frame 26 with hooks 158 at opposing ends of the strap, may be used to secure the bicycle wheels to the frame 26. A commonly known frame brace 160 is used to couple between the bicycle frame and the slide 24 to securely hold the bicycle in a generally vertical plane.

With the bicycle secured to the frame 26, the frame is pivoted about the pivot pins 94, into the upper position and the slide 24 is slid along the length of the base 22 to the forward position (FIGS. 1-3 and 9). With the slide 24 in the forward position, the back end of the frame 26 is located at the rear transverse load bar 32. In the position just described, the frame clamp 110 is used to lock the frame 26 and slide 24 relative to the base 22 by engaging the rear load bar 32 with the clamp hook 114 and tightening the hook nut 122 to draw the clamp hook 116 through the clamp body 112 and to draw the frame 26 and the rear transverse load bar 32 together. Unloading the bicycle from on top of the vehicle is substantially the reverse of the process just described.

Figure 10:
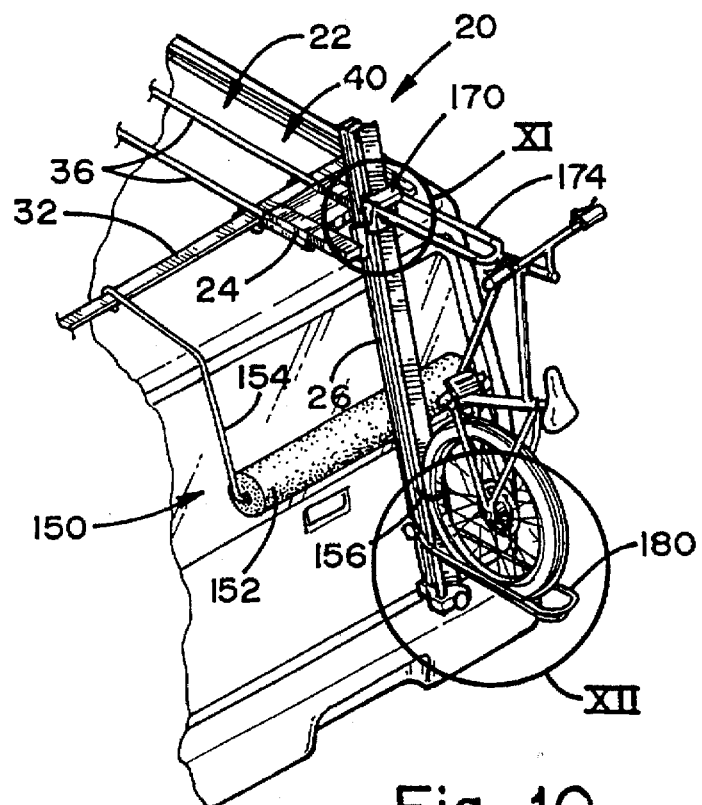
FIG. 10 is the view of FIG. 1 in fragment, showing an alternative bicycle securing arrangement.
Figure 11:
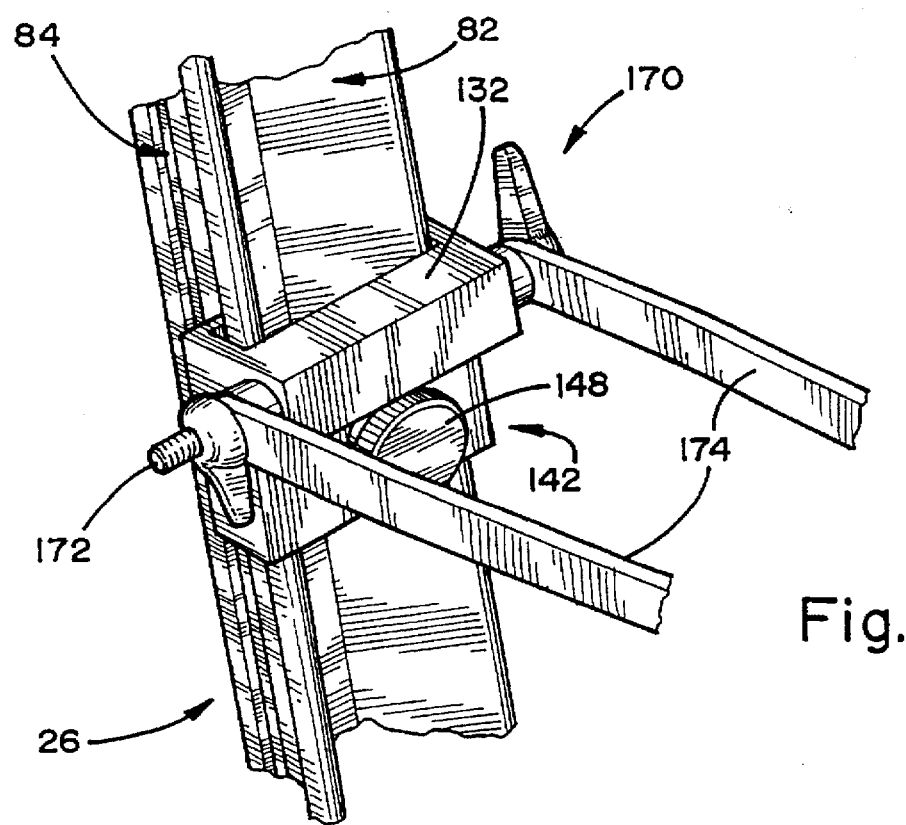
FIG. 11 is an enlarged view of detail XI of FIG. 10.

An alternative configuration 170 of the hanger 130, for securing a bicycle to the frame 26 is shown in FIG. 10. The hanger 130 may be converted from a tire hook hanger 130 to a fork mount or axle hanger 170 by removing the hanger hook 134 and the positioning spring 140 and inserting a standard bicycle axle 172 through the hanger body 132 (FIG. 11). Use of the rack system 20 with the fork mount hanger 170 instead of the hanger 130 with the hook 134, is substantially as described above. The only significant difference being that the front tire of the bicycle is removed and the bicycle fork 174 engages and couples with the axle 172 of the hanger 170, instead of coupling the front wheel with the hanger hook 134. It will be apparent to those who use or make the invention and to one having ordinary skill in the art, that the use of the axle hanger 170 is enhanced by the use of a commonly known quick release style of bicycle axle.

Figure 12:
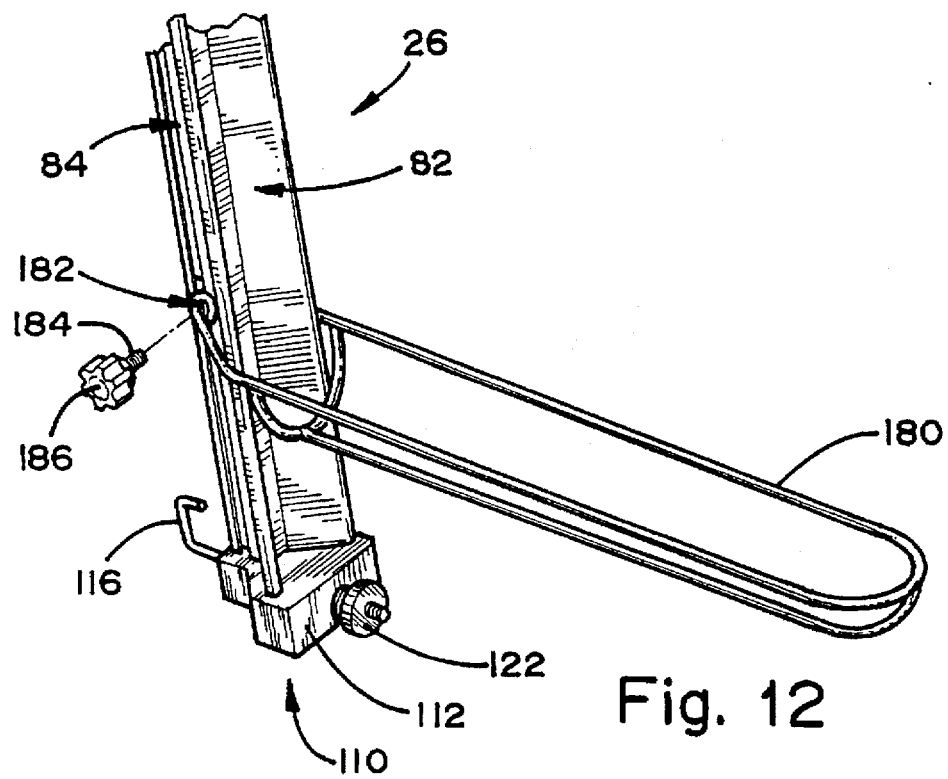
FIG. 12 is an enlarged view of detail XII of FIG. 10.

Further enhancement of the use of the axle hanger 170 is provided by use of the bicycle support 180 (FIG. 12). The bicycle support 180 extends generally perpendicular from the frame to releasably receive a tire, typically the rear tire of a bicycle. With the bicycle tire seated in the support 180, the tire will be aligned with and seated in the V-channel 82 and the operation of engaging the bicycle front fork 174 with the fork hanger 170 is made easier for the user because the weight of the bicycle is taken by the bicycle support 180, rather than requiring the user to simultaneously lift the bicycle and couple the front fork 174 with the axle hanger 170.

The bicycle support 180 may be made of any suitable, structural material, including, but not limited to, plastics and metals. As shown, the bicycle support 180 is constructed as a metal wire cage, using about ⅜ inch diameter (9 mm) wire. By providing bolt holes 182 in the bicycle support and using carriage bolts 184 and wing nuts 186 or the like, the bicycle support is conveniently mounted to the V-channel 82 and positioned along the V-channel 82. More particularly, with the carriage bolts 184 preassembled through the bolt holes 182 and the wing nuts 186 preassembled to the end of the carriage bolts 184, the frame clamp 110 is removed from the end of the V-channel 82 and the heads of the carriage bolts 184 are inserted into the seat portions 86 of the side channels 84. The bicycle support 180 may then be slid along the V-channel 82 to the desired position and the frame clamp 110 may be reassembled on the end of the V-channel 82.

Figure 13:
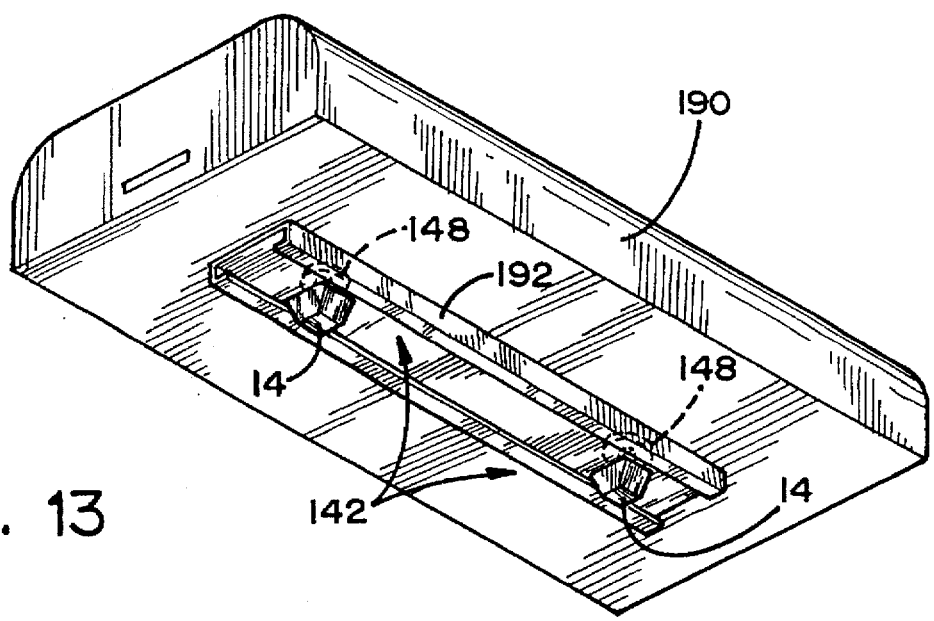
FIG. 13 is a bottom perspective view of a cargo box.

A cargo box 190 or the like (FIG. 13) may also be used with the rack system 20. The cargo box 190 is provided with a generally C-shaped channel member 192 that resembles the hanger body 132, for coupling with the V-channel 82 in sliding engagement. At least one, and preferably a pair of hanger locks 142 is provided to lock the cargo box 190 to the frame 26. Further, those who make or use the rack system 20 with a cargo box 190 and one having ordinary skill in the art will realize that the cargo box 190 is shown with a single mounting to couple with a single frame 26, and that a larger cargo box may have more than a single mounting to couple with two or more frames 26 of adjacent racks 20.

It will be understood by those who practice the invention and by one having ordinary skill in the art, that various modifications and improvements may be made without departing from the spirit of the disclosed concept. The scope of protection afforded is to be determined by the claims and by the breadth of interpretation allowed by law.

I claim:

1. A modular bicycle rack system for a vehicle that has a pair of transverse load bars, the transverse load bars being spaced along a length of the vehicle, said modular bicycle rack system comprising:

a rail that is adapted to extend at least between the pair of transverse load bars, and to connect with each of the transverse load bars;

a slide connected in sliding engagement with said rail to slide along a length of said rail between a storage position and an access position, said slide having a body with two opposing body ends and a slot, said slot extending through said two body ends and defining a rail receptacle, said rail being positioned in said rail receptacle with said slide extending around said rail to capture said rail in sliding engagement;

a channel pivotally connected with said slide to pivot when said slide is in said access position, between an upper position and a lower position; and a clamp connected with said channel, said clamp being adapted to couple with one of the transverse load bars to clamp said channel in said upper position when said slide is in said storage position.

2. The modular bicycle rack system defined in claim 1 wherein said rail is a first rail; wherein said modular bicycle rack system further includes a second rail that is spaced apart from, generally parallel with, and generally aligned with said first rail; and wherein said slide has a second cooperating rail receptacle, said second rail being positioned in said second rail receptacle with said slide extending around said second rail to capture said rail in said rail receptacle in sliding engagement.

3. The modular bicycle rack system defined in claim 1 wherein said rail includes two generally parallel rails.

4. The modular bicycle rack system defined in claim 1 wherein said channel defines a tire receptacle adapted to releasably receive a tire of a bicycle and hold the tire in alignment with said channel.

5. The modular bicycle rack system defined in claim 1 further including a hanger that is releasably connected with said channel, said hanger being adapted to releasably receive one of a tire and a front fork of a bicycle to support a bicycle on said channel, when said channel is in said lower position.

6. The modular bicycle rack system defined in claim 5 wherein said hanger includes a hanger lock, said hanger lock having a locked position in which said hanger is securely coupled with said channel, and an open position in which said hanger is movable from one location of said channel to another location of said channel.

7. The modular bicycle rack system defined in claim 6 wherein said hanger has a hanger body and a hook extending from said body, said hook being adapted to releasably receive a wheel of a bicycle whereby the bicycle hangs from and is supported by said hook, when said channel is in said lower position.

8. The modular bicycle rack system defined in claim 6 wherein said hanger has a hanger body and a fork bolt extending through said hanger body, whereby said fork bolt is adapted to engage a wheel fork of a bicycle for coupling the wheel fork with said channel.

9. The modular bicycle rack system defined in claim 6 wherein said hanger has a hanger body and a wheel bracket extending from said hanger body, said wheel bracket being adapted to engage a bicycle wheel to couple the wheel with said channel.

10. The modular bicycle rack system defined in claim 6 wherein said hanger has a support member, said support member extending generally perpendicularly from said channel for releasably receiving a tire of a bicycle, whereby a tire received by said support member is aligned with and seated in said channel and whereby the bicycle is supported by said support member when said channel is in said lower position.

11. The modular bicycle rack system defined in claim 1 further including a brace, said brace extending from said slide and being adapted to connect with a bicycle, said brace bracing the bicycle to hold the bicycle in a generally vertical plane.

12. The modular bicycle rack system defined in claim 1 further including a cargo box coupled with said channel to slide with said channel relative to said rail and to pivot with said channel between said upper and said lower positions.

13. A modular rack system for a vehicle that has a pair of transverse load bars, the transverse load bars being spaced along a length of the vehicle, said modular rack system comprising:

a rail, said rail having a front portion that is adapted to connect with a forward one of the pair of transverse load bars, and has a back portion that is adapted to connect with the rearward one of the pair of transverse load bars;

a slide connected in sliding engagement with said rail to slide along a length of said rail between a forward position at said front portion of said rail and a rearward position at said back portion of said rail, said slide having a body with two opposing body ends and a slot, said slot extending through said two body ends and defining a rail receptacle, said rail being positioned in said rail receptacle with said slide extending around said rail to capture said rail in sliding engagement;

a frame pivotally connected with said slide to pivot when said slide is in said rearward position, between an upper position and a lower position; and a clamp connected with said frame, said clamp being adapted to couple with one of the transverse load bars to clamp said frame in said upper position when said slide is in said forward position.

14. The modular rack system defined in claim 13 wherein said rail includes two generally parallel rails.

15. The modular rack system defined in claim 13 further including a hanger that is releasably connected with said frame, said hanger being adapted to releasably receive one of a tire and a front fork of a bicycle to support a bicycle on said frame, when said frame is in said lower position.

16. The modular rack system defined in claim 15 wherein said hanger includes a hanger lock, said hanger lock having a locked position in which said hanger is securely coupled with said frame, and an open position in which said hanger is movable from one location of said frame to another location of said frame.

17. The modular rack system defined in claim 16 wherein said hanger has a hanger body and a hook extending from said body, said hook being adapted to releasably receive a wheel of a bicycle whereby the bicycle hangs from and is supported by said hook, when said frame is in said lower position.

18. The modular rack system defined in claim 16 wherein said hanger has a hanger body and an axle extending through said hanger body, whereby said axle is adapted to engage a wheel fork of a bicycle for coupling the wheel fork with said frame.

19. The modular rack system defined in claim 16 wherein said hanger has a hanger body and a wheel bracket extending from said hanger body, said wheel bracket being adapted to engage a bicycle wheel to couple the wheel with said frame.

20. The modular rack system defined in claim 16 wherein said hanger has a support member, said support member extending generally perpendicularly from said frame for releasably receiving and supporting a bicycle when said frame is in said lower position.

21. The modular rack system defined in claim 13 further including a cargo box coupled with said frame to slide with said frame relative to said base and to pivot with said frame between said upper and said lower positions.

* * * * *

UNITED STATES PATENT AND TRADEMARK OFFICE
CERTIFICATE OF CORRECTION

PATENT NO. : 5,690,259
DATED : 11/25/97
INVENTOR(S) : Montani

It is certified that error appears in the above-identified patent and that said Letters Patent is hereby corrected as shown below:

Column 1, line 15:

"tracks" should be --trucks--;

Column 1, line 17:

"touting" should be --touring--;

Colmun 9,
Claim 1, line 16:

"damp" should be --clamp--.

Signed and Sealed this

Seventeenth Day of February, 1998

Attest:

BRUCE LEHMAN

Attesting Officer      Commissioner of Patents and Trademarks